US008007697B2

(12) United States Patent
Toncelli

(10) Patent No.: US 8,007,697 B2
(45) Date of Patent: Aug. 30, 2011

(54) METHOD FOR MANUFACTURING ARTICLES IN THE FORM OF THIN SLABS OF COMPOSITE STONE AND RESULTANT ARTICLES

(76) Inventor: Luca Toncelli, Bassano del Grappa (IT)

( * ) Notice: Subject to any disclaimer, the term of this patent is extended or adjusted under 35 U.S.C. 154(b) by 210 days.

(21) Appl. No.: 11/663,392

(22) PCT Filed: Sep. 8, 2005

(86) PCT No.: PCT/EP2005/054461
§ 371 (c)(1),
(2), (4) Date: Mar. 20, 2007

(87) PCT Pub. No.: WO2006/048350
PCT Pub. Date: May 11, 2006

(65) Prior Publication Data
US 2008/0111267 A1    May 15, 2008

(30) Foreign Application Priority Data
Sep. 20, 2004 (IT) .............................. TV2004A0103

(51) Int. Cl.
*B28B 21/14* (2006.01)
(52) U.S. Cl. ........... 264/71; 264/102; 264/333; 264/336
(58) Field of Classification Search .................... 264/71, 264/333, 334, 102, 336
See application file for complete search history.

(56) References Cited

U.S. PATENT DOCUMENTS

| | | | | |
|---|---|---|---|---|
| 3,612,491 A | * | 10/1971 | McKillop et al. | 366/27 |
| 3,904,723 A | * | 9/1975 | Prince | 264/71 |
| 4,075,380 A | * | 2/1978 | Moens | 428/140 |
| 4,209,335 A | * | 6/1980 | Katayama et al. | 588/252 |
| 4,224,274 A | * | 9/1980 | Ozawa | 264/333 |
| 4,353,748 A | | 10/1982 | Birchall et al. | |
| 4,419,135 A | * | 12/1983 | Hoge | 106/678 |
| 4,698,010 A | * | 10/1987 | Toncelli | 425/200 |
| 5,106,557 A | * | 4/1992 | Rirsch et al. | 264/118 |
| 5,122,191 A | * | 6/1992 | Morozumi et al. | 106/811 |
| 5,264,168 A | * | 11/1993 | Toncelli | 264/658 |
| 5,453,310 A | * | 9/1995 | Andersen et al. | 428/34.4 |
| 5,582,639 A | * | 12/1996 | Hove | 106/281.1 |
| 5,814,146 A | | 9/1998 | Maggio et al. | |
| 6,117,229 A | * | 9/2000 | Cassar et al. | 106/724 |
| 6,355,191 B1 | | 3/2002 | Toncelli | |
| 7,121,053 B2 | * | 10/2006 | Toncelli et al. | 52/414 |

FOREIGN PATENT DOCUMENTS

| | | | |
|---|---|---|---|
| DE | 4334730 A1 | * | 4/1994 |
| EP | 0 607 073 A | | 7/1994 |
| EP | 0 958 905 A | | 11/1999 |
| GB | 2 138 734 A | | 10/1984 |
| WO | WO 2005/049293 A | | 6/2005 |

OTHER PUBLICATIONS

International Search Report dated Jun. 12, 2006 and the Written Opinion from the corresponding PCT/EP2005/054461.
Pedersen J et al: "Cold isostatic pressing of cement pastes to produce pore reduced cement (PRC)" Journal of the European Ceramic Society, Elsevier Science Publishers, Barking, Essex, GB, vol. 18, No. 14, Dec. 1998, pp. 2089-2093, XP004144420 ISSN: 0955-2219; Paragraph [02.1].

* cited by examiner

*Primary Examiner* — Christina Johnson
*Assistant Examiner* — Elizabeth Royston
(74) *Attorney, Agent, or Firm* — Katten Muchin Rosenman LLP

(57) ABSTRACT

In a method for manufacturing slabs which are thin (10-30 mm) and broad, a cement mix comprising water, cement and a fluidizer is mixed with inert stone aggregate having a controlled particle size. The resultant mix is deposited in a predetermined thickness onto a temporary support and subjected to vacuum vibrocompression. The slab thus formed is subjected to the steps of setting and hardening by means of curing, enclosing it between two thin sheets of plastic impermeable to water vapor which are hermetically sealed along their edges. The method envisages specific measures as regards the method of mixing performed during the steps of preparation of the cement mix and mixing of the cement paste with the stone aggregate. Other improvements concern the components of the cement paste as well as the order of introduction of the aggregate during mixing with the latter.

20 Claims, No Drawings

METHOD FOR MANUFACTURING ARTICLES IN THE FORM OF THIN SLABS OF COMPOSITE STONE AND RESULTANT ARTICLES

This application is a National Phase Application of International Application No. PCT/EP2005/054461, filed Sep. 8, 2005, which claims the benefit under 35 U.S.C. 119 (a-e) of Italian Patent Application TV2004A000103, filed Sep. 20, 2004, which is herein incorporated by reference.

The present invention relates to the manufacture of thin slabs of composite stone consisting of one or more stone aggregates and a cement paste.

More specifically the present invention relates to a method for manufacturing these thin slabs (having a thickness of between 10 and 30 mm) and the slabs thus obtained. Normally an article consisting of one or more inert stone aggregates and a cement binder is known by the name of concrete. Today the cement binder par excellence is Portland, which is a reference product among hydraulic binders (binders which harden by means of reaction with water). Below, when talking about cement or cement binder, reference will be made essentially to Portland cement, without excluding, however, the use of other hydraulic binders having similar characteristics.

Concretes, owing to their considerable compressive strength, are mainly used for the construction of building structures.

The component "cement binder" (or also "cement paste") is formulated using water/cement (w/c) weight ratios such as to ensure the workability and fluidity thereof necessary for being able to pour and pack it inside formwork or shutterwork so that, after hardening, the geometrical form thereof is assumed.

A concrete with suitably metered components, where the cement paste has a w/c ratio of 0.50, has a satisfactory workability when using conventional packing systems, such as for example vibrating plates and tables or vibrating immersion needles, and is suitable for the construction of conventional building structures.

Concretes prepared with cement pastes having a w/c ratio sufficient to ensure the workability thereof are porous, since the mix water is always in excess of that used in the cement hydration process and therefore the cement mix has a significant micrometric capillary porosity.

According to the theory applicable to concretes, the w/c stoichiometric ratio necessary for hydrating completely the cement granules is 0.42 and in this situation a certain capillary porosity is produced, since the hydrated cement gel does not fill all the available space. According to the same theory, in order to manufacture articles with a gel/space ratio=1, where the cement paste is devoid of capillary porosity (with the possibility of externally added water), w/c ratios (by weight) of less than 0.3615 must be used.

The surface of the cement particles gradually hydrates with time, forming together with the mix water, the cement gel (consisting mainly of composite hydrosilicates), this increasing both towards the inside and towards the outside of the particle and forming a whole with the anhydrous nucleus of the particle and with the gel created by the adjacent particles, producing a continuum in the hardened paste. The process is nevertheless slow and, after one year of curing, the cement granules are hydrated over a depth of only 8 µm of the spheroidal perimeter of each individual particle. Slowly, in the presence of given porosity and permeability conditions of the article and the environmental humidity, the hydration of the anhydrous nucleus of the cement particles is able to continue, without, however, being completed not even over the course of many years.

The diameters of the particles which form the powder of a Portland 525 cement normally range from 0.1 to 60 µm with an average value of about 30 µm, so that the hardened cement paste necessarily contains anhydrous cement nuclei inside the particles hydrated in their cortical perimeter (also where the depth is much less than the said 8 µm), which particles are bonded together to form the mass of the gel.

Taking into account the size and distribution of the individual particles which form the cement powder and other minor associated phenomena, the cement which hydrates in contact with the mix water does not exceed, in practice, a quantity which ranges from 55 to 70% of the cement present in the mix. It follows that the quantity of mix water which will be used in the hydration process will be that resulting from the percentage of hydratable cement multiplied by the stoichiometric ratio of 0.42, namely:

(a) in the case of a percentage of hydratable cement equal to 55%, 23.1 liters of water (w/c=0.231) will be used per 100 kg of cement;

(b) in the case of a percentage of hydratable cement equal to 70%, 29.4 liters of water (w/c=0.294) will be used per 100 kg of cement.

On each occasion any excess quantity of water introduced into the mix with respect to the percentages indicated does not take part in the hydration process, but evaporates causing porosity in the hardened cement mix.

Therefore, in practice, in view of the impossibility of complete hydration of the cement, also with w/c ratios of less than 0.3615 and with externally added water there exists a capillary porosity which results in absorption of water of the cement article.

Therefore, in order to determine a minimum capillary porosity and therefore a minimum water absorption of the article, it is necessary to operate with w/c ratios of less than 0.29.

It is clear from that stated above that, with w/c ratios of less than 0.3615, part of the cement will not be hydrated. The presence of non-hydrated cement is not, however, prejudicial for the final strength of the article. On the contrary, from among various mixes all with a gel/space ratio=1, those with a greater proportion of non-hydrated cement (obtained with a lower w/c ratio) have a greater strength, probably owing to the fact that the layers of gel which surround the original particles of cement are thinner.

The physical/mechanical properties of a concrete are determined mainly:

by the porosity of the cement paste;
by the porosity of the system;
by the more or less intimate bonding of the cement paste to the surface of the aggregrates.

In concretes, the cement paste is the weak link of the chain within the system.

In fact the hardened paste (cement gel) may be compared to a stone material having a nanometric porosity of 28% by volume (referred to as "gel porosity") which is saturated with water which is stably absorbed and therefore cannot evaporate.

This porous rock, in the absence of externally added water, is moreover permeated by a micrometric capillary porosity, with an overall quantity of capillary spaces corresponding to 8.7% of its volume.

In structural concretes, obtained from formulations which can be easily compacted and characterized by w/c ratios of 0.36 and also of 0.50, the porosities, the imperfect adhesion of the paste to the surface of the aggregates and the consequent physical/mechanical properties are universally acceptable and accepted.

In fact, in structures, the flexural strength is not a very important factor and has an approximate value of about 40 to 70 N/mm$^2$, and likewise the water absorption, which ranges from 7 to 10% by weight, does not constitute a very important factor. The compression resistance values which can be obtained, as already mentioned, comply fully with the standards.

When, instead, it is required to manufacture articles of limited thickness and with large dimensions, such as for example slabs with a size of 300×140 cm and with thicknesses of 10 to 30 mm, it is absolutely necessary to achieve flexural strength values of not less than 20-22 N/mm$^2$, water absorption values of less than 1% and avoid any naturally pre-existing defects which would make them fragile especially at the thicknesses indicated.

The main object of the present invention is to provide a method which allows the production of thin slabs, in particular of the abovementioned type, in which the problems and drawbacks defined above are solved in an industrially advantageous manner.

This object is achieved with a method for manufacturing articles in the form of thin slabs, of the type where the one or more inert aggregates with a controlled particle size are mixed with a cement paste, a layer is formed on a temporary support, this layer is subjected to a vacuum compaction step, applying at the same time a vibratory movement with a predetermined frequency and duration, and then the steps involving setting and hardening of the resultant article are performed, characterized by the steps of:

(1) preparing the cement paste with a water/cement weight ratio of 0.21-0.25 by means of prolonged mixing of cement, water, fluidizer and latex, for a duration of a few minutes, preferably about 10 minutes, using mixing blades shaped so as to exert a cutting action on the mixture;

(2) mixing for about 7 minutes the cement paste obtained with the coarse aggregates having a size greater than 0.8 mm so as to line optimally the individual granules with a coating of cement paste;

(3) adding to the resultant mixture the remainder of the granulate, namely the medium-size granulate with a size of between 0.1 and 0.3 mm, and mixing for about 4 minutes until a homogeneous mixture is obtained;

(4) distributing the mix in the form of a layer with a predetermined thickness and dimensions on a temporary support or in a mould on which a sheet of plastic impermeable to water vapor is placed;

(5) covering the layer with a second sheet of plastic impermeable to water vapor and vacuum compaction with a vibrocompressive action;

(6) sealing, after compaction, the two sheets of impermeable plastic along their perimetral edges so as to form a kind of sheath;

(7) hardening the compacted sheet for about 24 hours, so as to achieve a condition suitable for handling; and (8) curing, for at least 7 days, the slabs kept always enclosed inside the sealed casing formed by the two said sheets of plastic.

Then the slabs are released from the casing and transferred for the finishing operations such as sizing and polishing.

In a preferred embodiment of the present invention a part, in the region of 5-15%, of the cement used for preparation of the initial cement paste is replaced with a fine powder having a pozzolanic activity, such as high-reactivity metakaolin (a term understood as meaning calcinated kaolin) or silica fumes (generic tradename for ash contained in steel foundry fumes), this mainly being in order to reduce the hydraulic shrinkage of the final article.

In connection with the preferred embodiment in step (1) it may be effective to add to the materials used in the preparation of the cement paste also about 20% of the coarse granulates which favor the separating action of the mixing blades on the fine powder. Especially at high ambient temperatures it is also convenient to add to the mixture a setting retardant of the type known in concrete technology, in order to prevent setting from starting before compaction of the article.

Still in relation to the preferred embodiment of the present invention, in order to obtain a final mix in a loose and deaeratable form, the medium-size granulate, which is added during the final stage of mixing of the cement paste with the stone aggregate, is supplemented with a hydrophilic additive, in particular dry carboxymethyl cellulose of the type which is fast-dissolving and resistant in a basic environment, addition of which is in the region of 2-3% by weight with respect to the quantity of water used for preparation of the initial cement mix.

If it is required to produce an article in the form of a thin slab which possesses a particular mechanical strength and in particular has anti-collapse properties in the event of breakage, the distribution of the mix inside the forming mould is performed in two separate steps, during each of which a proportion of the total quantity of mix used for formation of the slab is poured into the mould, between the first and second mix distribution step there being inserted a further step during which a layer of reinforcing material, preferably in the form of loose steel—preferably stainless steel—fibres, having a diameter of about 0.5 mm and length of about 20 mm is distributed onto the surface of the partial layer of mix already deposited in the mould, following which deposition of the second layer of mix is performed so that the reinforcing layer of steel fibres remains incorporated in the body of the article.

As an alternative to the loose steel fibres it is possible to use a meshwork or matting formed with thin metal wires having a diameter normally not greater than about 0.5 mm, preferably made of stainless steel.

Moreover, said central reinforcing layer may also consist of non-metallic material of suitable quality, for example glass fibres which are resistant to cement or plastics.

By way of further alternatives to the method of the present invention the following must be mentioned:

1) Curing of the formed and compacted slabs, after the hardening step of about 24 hours and after elimination of the vapor-impermeable plastic sheets, instead of being performed for a period of about 7 days is accelerated by placing the said slabs inside an autoclave, in a wet environment (i.e. in the presence of a liquid water phase) and at high temperature and pressure conditions, i.e. of about 180° C. and about 10 bar respectively, the treatment being continued for a few hours (preferably about 10). This variant of the method is particularly advantageous when the aggregates are of a siliceous nature, typically quartz, since in this case further chemical bonds between aggregate and hydrated cement are formed. The cement paste of the resulting slab, which is characterized by a reduced surface area and crystalline structure, has, after only 24 hours, the resistance values typical of a cement paste which has undergone curing for 28 days at room temperature, this also being accompanied by a hydraulic shrinkage 5-10 times less than that of the same paste cured in normal conditions.

The cement paste may be further supplemented with titanium dioxide in the form of anatase: in fact the photocatalytic properties of this substance are well known, so that once hardening has terminated, in the presence of light and atmospheric oxygen it is able to oxidise organic and inorganic polluting substances which are present in the atmosphere and which come into contact with the surface of the article, thereby obtaining on the one hand an effect where the superficial aesthetic characteristics of the article are preserved and performing on the other hand an action which eliminates the pollutants from the atmosphere in direct contact with the said article.

Among the possible additives for the mix it is also possible to mention lithoid elements (such as glass, shells and the like) which provide the final slab with particular aesthetic and form-related characteristics, appearing on the surface intended to remain visible. Moreover bactericidal agents may be added to the paste, these being well known in the sector of conglomerates and intended to be released slowly and for long periods from the surface of the slab. In this case the resultant slabs are particularly suitable for hygiene-sanitary applications.

If we now consider other characteristic aspects of the method of the present invention a first point to be mentioned is that the manufacture of articles in the form of thin and broad slabs with a very low water/cement ratio, less than 0.25, is made possible by adopting vacuum vibrocompressive compaction. In fact in the method according to the present invention it is possible to compact mixes with a water/cement ratio of 0.21-0.25, obtaining articles which after curing have exceptional flexural strengths even as much as 22 N/mm$^2$ and very low water absorption values (less then 0.5-0.7% by weight) after drying at 105° as prescribed by the corresponding standard.

If we now consider the step of preparation of the cement mix, it must first be pointed out that the ingredients include the so-called fluidizer, known in cement technology and preferably chosen from among the families of hydrosulphonated, acrylic, carboxylic and melamine superfluidizers or other effective families available on the market.

In relation to the aforementioned fluidizer, the cutting action which must be performed by the mixing blades, if necessary made more effective by the addition of about 20% of the coarse granulate, is decisive for ensuring that the fluidizer has an effective deflocculating effect on the clusters of cement granules. In other words in this way it is ensured that each individual cement particle is completely surrounded by water, this being an essential condition for optimum hydration of a mix with a very low water and cement ratio.

In turn, the latex, which is preferably an aqueous emulsion of acrylic resins with particles having an average size of 0.1 μm, is added to the starting mixture in order to perform various functions:

it facilitates the use of low w/c ratios, saturating the interstices present in the water and cement mixture;

it improves the adhesion between the particles of hydrated cement (the water of the dispersion is released from the latex to the cement during setting, resulting in coalescence of the latex which covers partly the gel with a plastic film);

it improves the mechanical properties of the article since it prevents the appearance of those microscopic fissures which are always present in the cement pastes of traditional concretes;

it reduces the final porosity of the cement paste, saturating the microporosity.

The use of latex in the method of the present invention allows the industrial production of an article which is practically free of microscopic defects and which in the technical literature is known as MDFC (Micro Defect Free Concrete).

As regards the addition of the medium-sized granulate (size 0.1-0.3 mm) only during the last mixing step, the aim of this measure is to avoid abrasion of the cement paste by the coarse granulate, damaging the quality of the interface between granulate and cement paste, which normally constitutes the weak point of a concrete; in fact, the physical/mechanical properties of the article depend essentially on the quality of the interface.

With regard, instead, to the replacement of part of the cement with metakaolin or silica fumes in the form of fine powders, their function is that of causing, by modifying the kinetics and the hydration products, an increase in the mechanical properties and a reduction in the permeability of the article, practically halving the hydraulic shrinkage and thus increasing considerably the stability of the article.

"Hydraulic shrinkage" is understood as meaning the reduction in volume of a wet concrete which is placed in an environment not saturated with moisture (basically drying of a wet concrete); in fact a non-uniform shrinkage of the various parts of an article (non-uniform drying) is the cause of considerable tension and may result in the appearance of dangerous fissuring.

Finally, if we consider the already mentioned addition of a hydrophilic product which is fast-dissolving and resistant in a basic environment, in particular dry carboxymethyl cellulose, it has the already mentioned function of loosening and deaerating the mix of cement paste and granulate so that it is prepared for the step of deposition in the forming mould and the following steps.

In fact, despite the very low water/cement ratio, the mix without this hydrophilic product is still slightly wet with an appearance similar to wet clay, making handling and deposition thereof as a thin layer in the forming mould difficult.

Another negative consequence of a mix devoid of this hydrophilic product arises if vibrocompaction of a mixture of two or more mixes of different colour is performed, since transmigration of the mix water and mixing of the colours occurs, resulting in an inferior aesthetic appearance. The colours of the mixes should, however, preferably remain well differentiated.

Finally, if we consider the forming or moulding steps and the curing step, the slab is compacted between two sheets of vapor-impermeable plastic (for example polyethylene or ethylene vinyl chloride (EVA)) which are heat-sealed along their perimeter in order to ensure hardening and curing without loss of water. In this way all the mix water is used for hydration of the cement, without the occurrence of porosity in the article which would be caused by a loss of water due to exposure of the formed and moulded article to the normal environmental conditions. Preferably the slab is formed on top of a strong cloth which is then pulled onto a perfectly flat, rigid, metallic surface on which initial hardening takes place, lasting about 24 hours.

After 24 hours normally the slabs are cured in the vertical position, being kept always sealed for about 7 days, before being sized and polished.

An example which illustrates the production of a slab according to the present invention is now provided.

| | |
|---|---|
| Binder | White Portland 525 cement |
| Granulate | Quartz/siliceous sand |
| | % volume |
| Portland cement | 16.0 |
| Water (including fluidizer water) | 6.7 |

-continued

| Binder<br>Granulate | White Portland 525 cement<br>Quartz/siliceous sand<br>% volume |
|---|---|
| Latex (water) | 5.0 |
| Latex (solid part) | 4.3 |
| Latex to be weighed | 9.3 |
| Metakaolin 501 | 1.6 |
| Siliceous sand 0.1-0.3 mm | 16.0 |
| Quartz 0.8-1.2 mm | 17.5 |
| Quartz 1.2-2.5 mm | 32.9 |
| | 100.0 |
| Kg cement per m$^3$ | 504 |
| Water/cement weight ratio | 0.231 |
| Water/binder powder weight ratio | 0.213 |
| Fluidizer | 1263.4 g (4.0% relative to cement weight) |
| Carboxymethyl cellulose | 219.15 g (3.0% relative to water weight) |
| Dye | 100 g |
| % solid latex relative to cement weight | 9.8% |

Firstly preparation of the cement paste is performed by mixing water, fluidizer, 20% of coarse granulate, Portland cement, metakaolin and latex for 10 minutes in a high-efficiency epicycloidal mixer.

The remaining granulates consisting of larger size quartz (0.8-2.5 mm) and the dye are added to the mix present in the mixer and mixing is continued for a further 7 minutes.

Then the fine granulates (siliceous sand 0.1-0.3 mm) and the carboxymethyl cellulose are added and mixing is continued for a further 4 minutes. A forming mould of cloth-reinforced rubber, on which a sheet of EVA has been placed, is filled with this mix, forming a layer of predetermined size and thickness.

After the layer has been covered by a second sheet of EVA it is vacuum-compacted with a vibrocompressive action so as to form a slab with dimensions of 140×310×2 cm.

After compaction, the two sheets of impermeable plastic are heat-sealed along their perimetral edges so as to form a kind of sheath.

Then the mould is transferred onto a perfectly flat metallic support on which hardening of the compacted slab is performed for about 24 hours, so as to achieve a condition suitable for handling.

After 24 hours have lapsed, the hardened sheet is placed vertically and allowed to cure for at least 7 days always enclosed inside the sealed casing formed by the two said sheets of plastic.

Once the week of curing has ended, the sheets of EVA are removed and the slab is sized and polished.

The resultant article is subjected to tests, resulting in a flexural strength of 22 N/mm$^2$ and a water absorption of only 0.6% after drying at 105° C.

The invention claimed is:

1. A method for manufacturing a thin slab, the thin slab being between 10-30 mm in thickness, the method comprising the steps of:
   (a) mixing cement, water, fluidizer and latex to form a cement paste, mixing being performed using mixing blades shaped to exert a cutting action on items being mixed;
   (b) coating a first plurality of coarse aggregate with the cement paste and a hydrophilic additive to form a first intermediate mix, each granulate of the coarse aggregate being a greater than 0.8 mm, the hydrophilic additive is dry carboxymethyl cellulose of the type which is fast-dissolving and resistant in a basic environment;
   (c) adding a second plurality of coarse aggregate to the first intermediate mix to obtain a second intermediate mix and homogenizing the second intermediate mix;
   (d) lining a temporary support or mould with a first sheet of plastic impermeable to water vapor;
   (e) distributing the second intermediate mix to form a material layer of predetermined size and thickness on the temporary support or in the mould;
   (f) applying onto the material layer a second sheet of plastic impermeable to water vapor;
   (g) vacuum compressing with an accompanying vibrating action the material layer thus enclosed by the first and second sheets to form a molded article;
   (h) sealing the first and second sheets of plastic along their perimeter to form an encased molded article;
   (i) transferring the encased molded article onto a rigid and flat hardening support;
   (j) permitting setting of the encased molded article until the encased molded article is suitably hardened for handling; and
   (k) curing for at least 7 days the encased molded article to form the thin slab.

2. The method according to claim 1, wherein
   step (a) has a duration of 10 minutes;
   step (b) has a duration of 7 minutes;
   step (c) has a duration of 4 minutes;
   step (j) has a duration of 24 hours.

3. The method according to claim 1, wherein the second plurality of coarse aggregate comprises a medium-sized granulate with a size not exceeding 0.3 mm.

4. The method according to claim 1, wherein in step (a) a part of the cement used is replaced with a fine powder having a pozzolanic activity.

5. The method according to claim 4, wherein said fine powder with a pozzolanic activity is chosen from among metakaolin and silica fumes.

6. The method according to claim 4, wherein said fine powder with a pozzolanic activity is added in a quantity of 5-15% by weight of the cement used for preparation of the cement paste.

7. The method according to claim 1, wherein in step (a) at least one proportion of coarse granulate is included among the materials for preparation of the cement paste.

8. The method according to claim 1, wherein in step (b) said coarse granulate is added in a quantity of at least 20% by weight of a total weight of coarse aggregate.

9. The method according to claim 1, wherein step (a) further comprises mixing a setting retardant to form the cement paste.

10. The method according to claim 1, wherein said hydrophilic agent is added in a quantity equivalent to 2-3% by weight of the quantity of water used in preparation of the cement paste.

11. The method according to claim 1, wherein step (a) further comprises mixing titanium dioxide in the form of anatase to form the cement paste.

12. The method according to claim 11, wherein titanium dioxide is in a quantity of about 10% relative to the weight of the cement.

13. The method according to claim 1, wherein step (k) further comprises removing at least a portion of the plastic sheet to expose the molded article to the ambient environment, and wherein step (k) is performed in an autoclave in the presence of liquid water, at a high temperature and a high pressure.

14. The method according to claim 13, wherein step (k) further comprises setting a pressure of the autoclave to 10 bar and a temperature in the autoclave to about 180° C., and wherein step (k) has a duration of 10 hours.

15. The method according to claim 1, wherein step (e) is performed in three phases,
   a first phase in which a first layer of mix is deposited having a first thickness equal to a proportion of the total thickness of the layer,
   a second phase in which a reinforcing material is deposited onto an upper surface of said first layer, and
   a third phase in which a second layer of mix, also having a second thickness equal to a proportion of the total thickness of the layer, is deposited onto said reinforcing material.

16. The method according to claim 15, wherein said reinforcing material is chosen from among metal fibres, metal meshwork, thin metal wire felt, glass fibres resistant to the cement and fibres of plastic.

17. The method according to claim 16, wherein said metal fibres are made of stainless steel having a diameter of 0.5 mm and a length of 20 mm.

18. The method according to claim 1, wherein step (a) is performed with a water/cement weight ratio of less than 0.25 and ranging between 0.21 and 0.25 is used.

19. The method according to claim 1, wherein the fluidizer is chosen from among the families of hydrosulphonated, acrylic, carboxylic and melamine fluidizers or other known effective families.

20. The method according to claim 1, wherein step (a) further comprises a bactericidal additive to form the cement paste.

* * * * *